US007891000B1

(12) United States Patent
Rangamani et al.

(10) Patent No.: US 7,891,000 B1
(45) Date of Patent: Feb. 15, 2011

(54) METHODS AND APPARATUS FOR MONITORING AND REPORTING NETWORK ACTIVITY OF APPLICATIONS ON A GROUP OF HOST COMPUTERS

(75) Inventors: Venkat Raghavan Rangamani, Arlington, MA (US); Philip J. S. Gladstone, Carlisle, MA (US); Brian F. Costello, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 1304 days.

(21) Appl. No.: 11/197,861

(22) Filed: Aug. 5, 2005

(51) Int. Cl.
*G06F 11/00* (2006.01)
*G06F 12/14* (2006.01)
(52) U.S. Cl. .................................. 726/22; 709/224
(58) Field of Classification Search .................. 726/22; 709/224
See application file for complete search history.

(56) References Cited

U.S. PATENT DOCUMENTS 7,174,566 B2 * 2/2007 Yadav ........................ 726/26
2004/0167859 A1 * 8/2004 Mirabella .................... 705/59
2005/0235058 A1 * 10/2005 Rackus et al. ............... 709/224

* cited by examiner

*Primary Examiner*—Christopher J Brown
(74) *Attorney, Agent, or Firm*—Hickman Palermo Truong & Becker LLP (57) ABSTRACT

A security management system provides rules for monitoring network activity of applications to groups of host, computers, specifically activity indicating that communications mechanisms have been established (i.e. open TCP ports) but are receiving little or no use (i.e., few connection acceptances). Agents on the hosts utilize monitoring software inserted between the applications and the network protocol stacks. The agents store network activity data gathered during the monitoring in local storage, and periodically upload the data to a centralized server in a compressed and optionally encrypted fashion. The server uses the uploaded data from all hosts to update a security management database reflecting the network activity of all the hosts. Reports may be generated to identify activity that may present security risks, such as open but inactive ports, to enable a network administrator to take remedial action such as de-activating or de-installing applications.

38 Claims, 6 Drawing Sheets

Title: Unused network server ports

Description: Network server applications that have been listening but accepting less than 15 connections in the past week

7/19/2005   5:42:38PM

Host : venkat-dev.amer.cisco.com

| Process Name | Process Path | Port |
|---|---|---|
| Apache.exe | C:\Program Files\CSCO\pxlib\web | TCP/1741 |
| Apache.exe | C:\Program Files\CSCO\pxlib\web | TCP/1742 |
| Apache.exe | C:\Program Files\CSCO\pxtMDC\Apache | TCP/80 |
| Apache.exe | C:\Program Files\CSCO\pxtMDC\Apache | TCP/443 |
| Apache.exe | C:\Program Files\CSCO\pxtMDC\Apache | TCP/1751 |
| cmrsh.exe | C:\Program Files\CSCO\pxbin | TCP/5401 |
| cwjava.exe | C:\Program Files\CSCO\pxbin | TCP/514 |
| cwjava.exe | C:\Program Files\CSCO\pxbin | TCP/1683 |
| cwjava.exe | C:\Program Files\CSCO\pxbin | TCP/1684 |
| cwjava.exe | C:\Program Files\CSCO\pxbin | TCP/8088 |
| cwjava.exe | C:\Program Files\CSCO\pxbin | TCP/9091 |
| cwjava.exe | C:\Program Files\CSCO\pxbin | TCP/9092 |
| cwjava.exe | C:\Program Files\CSCO\pxbin | TCP/9093 |
| dbsrv7.exe | C:\Program Files\CSCO\pxtobjects\db\win32 | TCP/10033 |
| dbsrv7.exe | C:\Program Files\CSCO\pxtobjects\db\win32 | TCP/43441 |
| dmgtd.exe | C:\Program Files\CSCO\pxlib\jre\2\bin | TCP/42340 |
| dmgtd.exe | C:\Program Files\CSCO\pxlib\jre\2\bin | TCP/65535 |
| jrsw.exe | C:\Program Files\CSCO\pxbin | TCP/42343 |
| jrsw.exe | C:\Program Files\CSCO\pxbin | TCP/57860 |
| medtr.exe | C:\WINNT\system32 | TCP/3372 |
| pageserver.exe | C:\Program Files\CSCO\pxtCSAMC45\rtWCS | TCP/6403 |

Fig. 5

METHODS AND APPARATUS FOR MONITORING AND REPORTING NETWORK ACTIVITY OF APPLICATIONS ON A GROUP OF HOST COMPUTERS

BACKGROUND

In a typical networked computer system, application programs engage in network communications with other devices or computer systems in a structured manner. Many computer systems employ library routines known as "sockets" that carry out high-level communications requests generated by application programs. Each socket in turn relies on the functionality of a protocol stack in the operating system that implements lower-level network functionality. An example of a protocol stack in wide use today is the Transmission Control Protocol/Internet Protocol (TCP/IP) stack. TCP is a communication oriented, end-to-end transport mechanism, and IP is a packet routine protocol that is used to carry TCP-generated packets. An alternative protocol is the User Datagram Protocol (UDP), which provides for delivery of individual "datagrams" or packets without any session context such as appears in TCP.

Both TCP and UDP utilize the notion of a "port" to identify users of the service, typically application programs. Application programs associate their sockets with specific ports using a "bind" operation. Each bind operation informs the operating system that communications between the socket and the network are to be tagged with the designated port number. By tagging the communications of different applications with different port numbers, the protocol stack can coherently provide communications services for potentially numerous applications.

As part of operation with TCP in particular, an application performs a "listen" operation when it is ready to accept incoming TCP connection requests directed to a particular port designated as part of the listen operation. A good example of such an application program is a web server, which typically waits for remote clients to establish connections over which the client-server communications are subsequently conducted. When an application program performs a listen operation, the operating system enables a queue onto which incoming connection requests for the designated port are placed. At this point the port is said to be "open" If a listen operation for a particular port has not occurred, then the port is "closed" and any incoming connection requests for the port are discarded.

As a final step in TCP connection establishment, an application program performs an "accept" operation to accept a connection request from the now-enabled queue. When an accept operation is performed and the queue is empty, the application program is notified that there are no new connection requests. When an accept operation is performed and there is at least one connection request on the queue, the accepting computer system generates appropriate signaling back to the requesting computer system and sets up internal mechanisms for passing communications internally between the application program and the network interface. The two endpoints of the connection can now exchange packets. This connection-establishment operation is fundamental to TCP operation—any attempt to simply transmit data packets from one end to the other without having first established a connection will result in the discarding of such packets.

UDP operation is somewhat different than TCP operation. Once the socket has been bound to a port, packets may be transmitted/received by the application program to/from a far-end source/destination. An application transmits a packet by passing it to UDP with information identifying the intended recipient (typically an IP address). To receive a UDP datagram, an application may poll the port or utilize an internal notification mechanism such as an interrupt.

It is known that the network interface of a computer system presents challenges from the perspective of system security. Server-type computer systems, for example, must have some degree of openness at their network interfaces in order to function properly, i.e., to establish connections on request of clients and engage in whatever communications activity is required in satisfying a client request. Attackers often gain access via a network interface, for example by directing connection requests to various ports and, when a connection request is accepted, manipulating an application and/or the operating system remotely via the connection. There are existing security tools that an administrator can use to identify the network ports that are active on a computer system. The administrator can use this information to help identify potential points of entry for an attacker, such that appropriate counter-measures can be taken. These might include, for example, de-activating unnecessary application programs or placing a limit on the number of ports or connections that can be active at one time.

SUMMARY

Networked computer systems are an increasingly essential part of modern life, being utilized for an expanding array of personal, business, and governmental activities. Because of society's increasing dependence on these systems and the increasing sophistication of security threats from attackers, computer system security is becoming more important. Although existing security tools may be useful in certain applications, new tools that are effective in modern computing environments are needed.

In particular, there is a need for well organized security measures in computer systems that may include a large number of individual computers. Examples of such systems include corporate and governmental networks, as well as server "clusters" or "farms" that co-operate to share a large transaction burden, such as on-line banking systems and large web sites. Administrators of large networked computer systems require security tools that efficiently provide a desired level of monitoring and control across tens, hundreds, or even thousands of individual computers.

Accordingly, methods and apparatus are disclosed for efficiently monitoring and reporting network activity of applications on a group of host computer systems. Specifically, the disclosed methods and apparatus may be used to identify network communications ports that may present security risks, such that appropriate remedial action can be taken.

At a management computer system, network activity monitoring rules are provided to the host computer systems being monitored. The network activity monitoring rules include rules for monitoring first and second network operations performed by the applications, where each first network operation establishes a communications mechanism by which an application can engage in network communications with another computer system, and each second network operation indicates that a respective communications exchange utilizing the communications mechanism has occurred between an application and the other computer system. In one embodiment, the first network operation may be a listen operation that enables a queue to incoming connection requests at a particular TCP port, and the second operation may be an accept operation at the same port. The method thus can be used to detect ports that are enabled by applications but not in active use, which may present undesirable security risks.

At each host computer system of the group, the network activity of the applications residing on the host computer system is monitored in accordance with the network activity monitoring rules provided by the management computer system. Each host stores local network activity data describing the monitored network activity of its applications, and periodically uploads the local network activity data to the management computer system. The upload interval may be on the order of one hour for example, and may be user-specifiable. Additionally, the uploading from a large number of hosts may be spread out over the interval to avoid creating communications bottlenecks.

The management computer system receives the local network activity data uploaded from each of the host computer systems of the group and utilizes the uploaded data from each of the host computer systems to periodically update a management database including network activity data for all the host computer systems of the group. In response to user request, the management computer system generates a user-readable report from the management database showing the network activity of the applications of the host computers of the group. The report can be generated in accordance with a user-customized template. An example report lists those applications in the group of hosts that are listening on ports but have not accepted more than some number of connection requests over a recent interval. Such a report can be used to identify open ports that may present a security risk, and enable an administrator to take appropriate remedial action such as disabling or de-installing the associated application.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 4 (consisting of FIGS. 4(a) and 4(b)) is a screen shot of a user interface window for specifying the contents of a network activity report in the network activity reporting method of FIG. 2.

DETAILED DESCRIPTION

Figure 1:
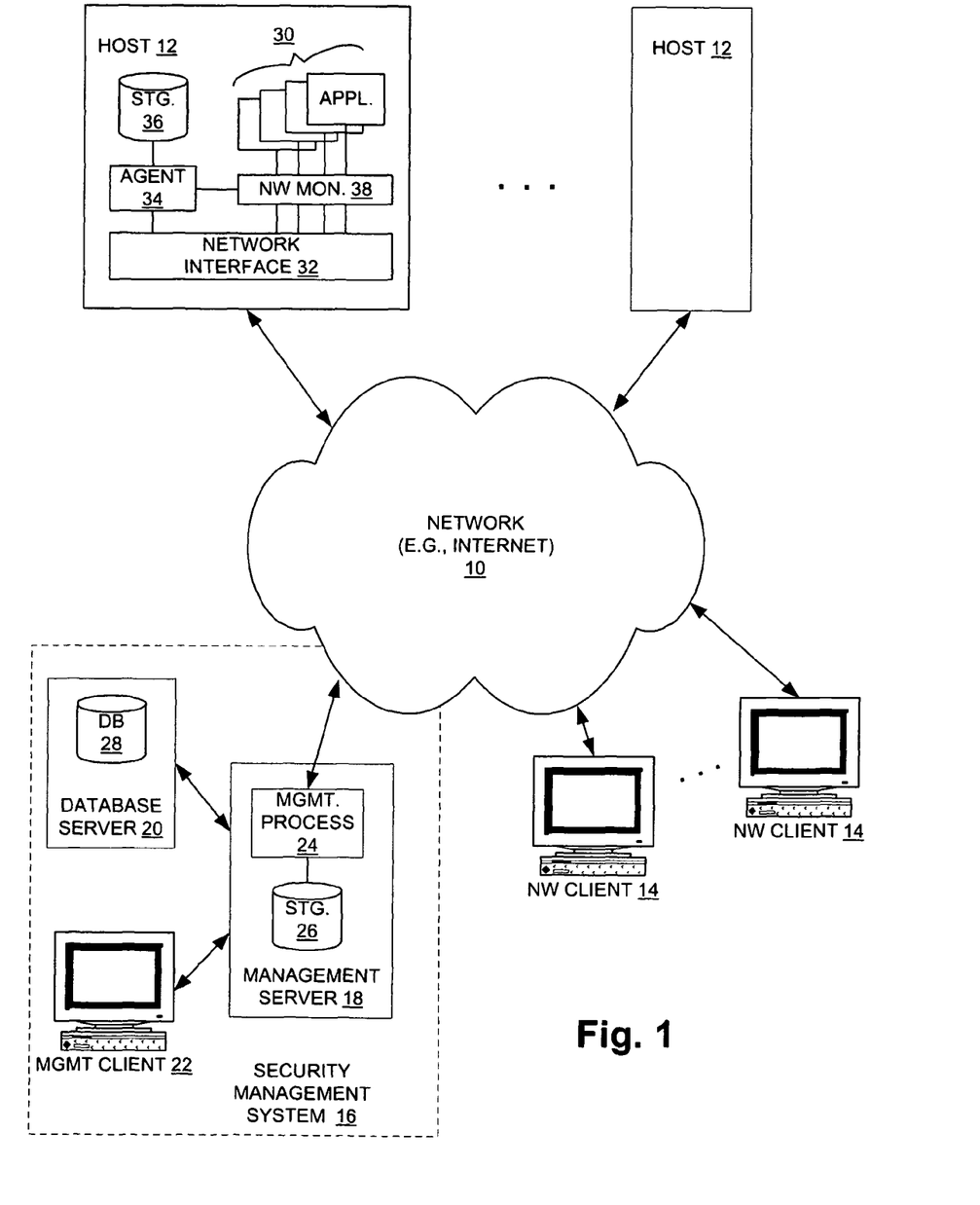
FIG. 1 is a block diagram of a network having apparatus and methods for monitoring and reporting network activity of server applications in accordance with the present invention.

FIG. 1 shows a system in which a network 10 interconnects a plurality of host computer systems (hosts) 12, a plurality of network user computer systems (NW clients) 14, and several components of a security management system 16. The security management system 16 includes a management server 18, a database server 20, and a management user computer system (MGMT client) 22. The management server 18 includes a management process 24 and related storage (STG) 26. The database server 20 stores and provides access to a centralized security management database 28.

As shown, each host 12 includes a plurality of application programs (APPL) 30, which may include for example Web servers, database servers, electronic mail servers, and/or various other applications that normally engage in network communications with other computer systems via a network interface 32 and the network 10. Each host 30 also includes a security management agent (agent) 34 with associated local storage (STG) 36, and a network activity monitoring component (NW MON) 38 (which is referred to herein as the "NW monitor 38"). As shown, the NW monitor 38 is disposed between the applications 30 and the network interface 32, and communicates with the agent 34 to report on network activity. The agent 34, local storage 36 and NW monitor 38 also form part of the security management system 16, specifically as a set of security management components that are replicated on each host 12 that is subject to monitoring by the security management system 16.

The NW monitor 38 may be realized in a variety of ways. It can consist of one or more "shims" which, as known in the art, are relatively small ancillary pieces of software that can be added to an operating system. The shim(s) intercept specified actions or data at one interface (e.g., the application or NW interface), replicate these at a second interface (e.g., the NW interface or application), and also forward the intercepted items to an interface to a monitoring application (such as the agent 34). One well-known applications programming interface (API) used in network communications is the Transport Data Interface or TDI, and thus one example of a NW monitor 38 is a TDI shim. Alternative NW monitors 38 include so-called layered service providers or LSPs. In yet another alternative, a user-level tool may be used such as a tracer or logger. Some details of operation of the NW monitor 38 are given below.

As described above, the operations monitored by the NW monitor 38 may vary depending on the type of communications protocol being used. For a TCP interface, the NW monitor 38 detects and reports when an application 30 performs either a listen operation or an accept operation. The listen operation indicates that a queue for incoming connection requests has been enabled, and the accept indicates that a connection request has actually been accepted from the queue. The connection request queue is an example of a communications mechanism that is established by a first network operation (e.g., a listen), and the acceptance of a connection from the connection request queue is an example of the use of such a communications mechanism that is indicated by a second network operation (e.g., an accept).

Figure 2:
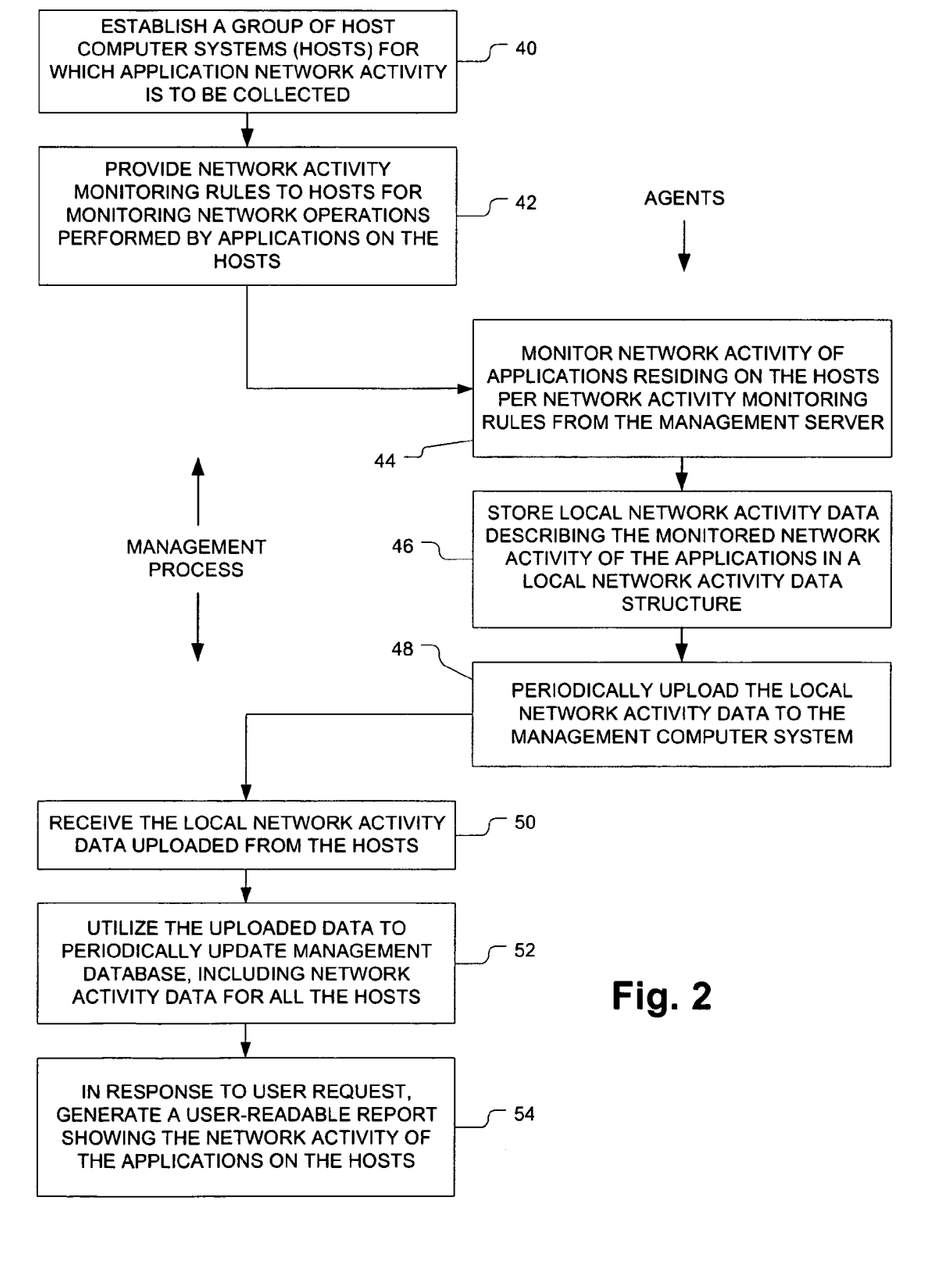
FIG. 2 is a flow diagram of a method of monitoring and reporting network activity of server applications in the network of FIG. 1.

FIG. 2 illustrates the overall operation of the security management system 16. On the left are operations of the management process 24 on the management server 16, and on the right are operations of the agents 34 on the hosts 12. In step 40, a management user interacts with the management process 24 to define or establish one or more groups of hosts for which application network activity is to be monitored. Examples of such groups and a user interface screen used in establishing the groups are shown below. In step 42, the management process 24 creates network activity monitoring rules and provides them to the hosts 12 (i.e., to the agents 34). Again, examples are described below.

Steps 44-48 are carried out by the agents 34 in conjunction with the NW monitor 38 at each host 12 subject to monitoring. In step 44, the agent 34 and NW monitor 38 monitor the network activity of one or more applications 30 based on the rules received from the management server 18. In step 46, the agent 34 stores network activity data that describes the network activity in a local network activity data structure within the local storage 36, such as a table or set of tables. The local network activity data may be stored in a summary form for greater storage efficiency, such as by recording duplicate entries by use of a single entry and a counter rather than storing each duplicate entry in full. In step 48, the agent 34 periodically uploads the local network activity data from the local data structure to the management server 18. As shown below, the uploading period may be user-selectable. An example of a suitable uploading period may be 24 hours.

Steps 50-54 of FIG. 2 are performed at the management server 18 in conjunction with the database server 20 and the management client 22. In step 50, the management process 24 receives the periodic uploads from the respective agents 34 of each of the hosts 12. This part of the process 24 may be a background demon process, for example, and the uploaded data may be stored in a set of directories (folders) and files within the storage 26. The uploaded data is preferably stored with a time stamp indicating when the data was uploaded, which occurs automatically if a file system is utilized.

In some embodiments, the security management system 16 may be responsible for monitoring the network activity of a large number of hosts 12, for example on the order of several thousands. It will be appreciated that the uploading of network activity data from such a large number of hosts 12 may require substantial network communications bandwidth. Accordingly, it may be desirable to employ techniques to reduce the burden placed on the network 10. It may be desirable to stagger the times at which the hosts 12 perform their uploads, to avoid creating time-based communications bottlenecks. The agents 34 may apply data compression to the collection of network activity data and upload the compressed data to the management server 18, where the data is expanded back to its original form. Such data compression may be used in addition to data encryption for security purposes.

In step 52, the management process 24 updates the security management database 28 based on the network activity data uploaded from the hosts 12. This updating is preferably done periodically, with each update including data from those hosts 12 that have uploaded their network activity data since the last update. Because of the potentially large volume of data communications between the management server 18 and the database server 20, the updates are preferably performed in as efficient a manner as possible. In one embodiment, the database server 20 is capable of handling so-called "bulk insertions" in which a plurality of database records are updated as part of one overall transaction. Bulk insertions enhance efficiency by greatly reducing the number of database transactions that are required to update a set of database records.

In step 54, the management process 24 responds to a user request received via the management client 22 to generate a user-readable report of network activity of the applications 30 as reflected in the security management database 28. This report may be used for a variety of security-related purposes. In one example described below, a report provides information about applications 30 that have open ports for network communications but have not received more than some small number of network connection requests over a recent time period. A security management user may use such information to selectively de-install such applications 30 to reduce the security risks associated with open ports.

Figure 3:
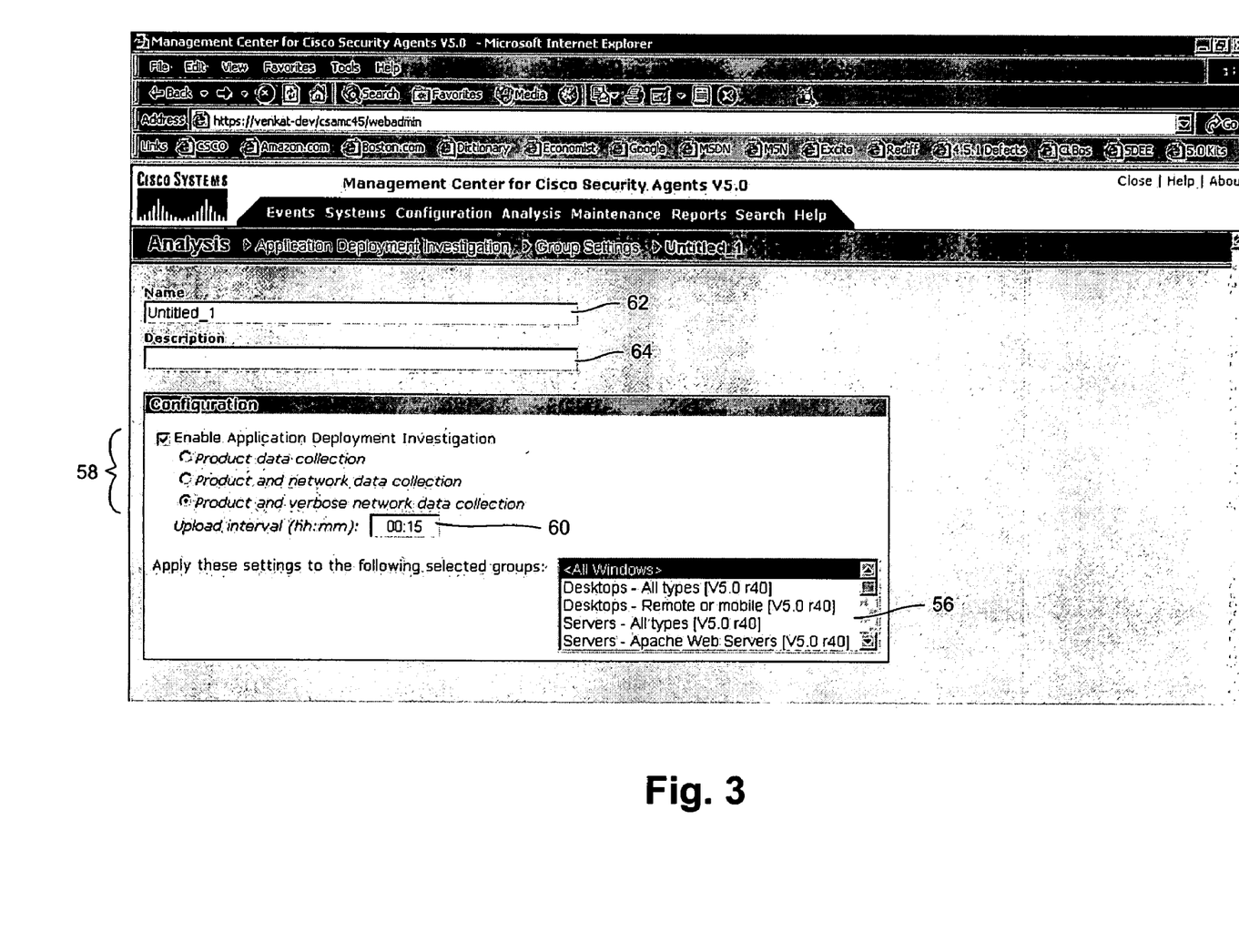
FIG. 3 is a screen shot of a user interface window for establishing group settings for the network activity monitoring of FIG. 2.

FIG. 3 shows a user interface screen utilized in the management client 22 for enabling the monitoring of application network activity on a group basis. A first scrolling list 56 lists candidate groups of computer systems that have been previously defined. Examples include "Desktops—All types", "Desktops—Remote or mobile", "Servers—All types", and "Servers—Apache Web Servers" as shown, where Apache refers to an open-source Hypertext Transfer Protocol (HTTP) server developed under the auspices of an organization known as the Apache Software Foundation. A set of checkboxes 58 is used to configure the selected group(s) to (1) enable or disable "application deployment investigation" (i.e., application network activity monitoring as described herein) and (2) the type and extent of data to be gathered. The user can also select the interval between uploads of the data via input box 60. The user can apply a name and a brief description to the selected settings via input boxes 62 and 64.

The following tables describe the contents of two data structures included in the security management database 28 (FIG. 1). The first data structure is a network activity data structure storing the network activity data reported by the hosts 12, organized as list of multiple-field (or multiple-column) entries (or rows). Each entry includes information for a network-related event that has occurred within a host 12 whose network activity is being monitored. The fields for this data structure include the following:

TABLE 1

| Field | Brief Description |
| --- | --- |
| network_info_id | entry identifier (row number) |
| host_id | identifier of host computer |
| process_path_id | process path identifier |
| parent_process_path_id | parent process path identifier |
| time_observed | time stamp |
| network operation | network operation that was performed |
| protocol | network protocol, e.g. TCP, UDP |
| source_port | number of source port for operation |
| dest_port | number of destination port for operation |
| source_addr | source address |
| dest_addr | destination address |
| process_path_name | process path (e.g. c:/windows/ . . . ) |
| parent_process_path_name | parent process path |
| process_name | process name |
| flags | operation details e.g. TDI request type |

Table 2 below describes the contents of a second data structure, referred to as a process information data structure, that is used to store process information. It is often the case that processes have the same names and paths across multiple host computers. For example, the process names and paths for the Apache web server or Internet Information Server (IIS) may be the same on many host computers, and thus it may be more efficient to store such common process information in a separate data structure that is referenced from the main data structure. In this case, the reference (or key) is the "process_path_id" which appears in both data structures. Each entry in the process information data structure associates a process_path_id with a process path and process name for a process that exists in one or more of the monitored hosts 12. The process path and process name are stored as they normally are represented (i.e. as potentially long strings). Each entry in the network activity data structure includes a process_path_id to refer to an entry of the process information data structure that contains the process path and process name for the process whose activity is reflected in the network activity data structure entry.

TABLE 2

| Field | Brief Description |
| --- | --- |
| process_path_id | process path identifier |
| process_path_name | process path (e.g. c:/windows/ . . . ) |
| process_name | process name |

In some cases, the bulk insertion process may be capable of updating only one data structure, and thus special procedures may be needed when a separate data structure for commonly appearing items is used. As an example, it may be necessary to employ a specialized routine that can identify the process information included in the bulk insertion, obtain the corresponding process_path_id from the process information data structure, and include the process_path_id in the database records being added. This routine may be invoked via a "trigger", which is a rule or condition that is defined with respect to the main data structure. In the case of process information, for example, such a trigger might invoke the specialized routine for accessing the process information data structure whenever a database record that includes process information is being inserted.

Figure 4A:
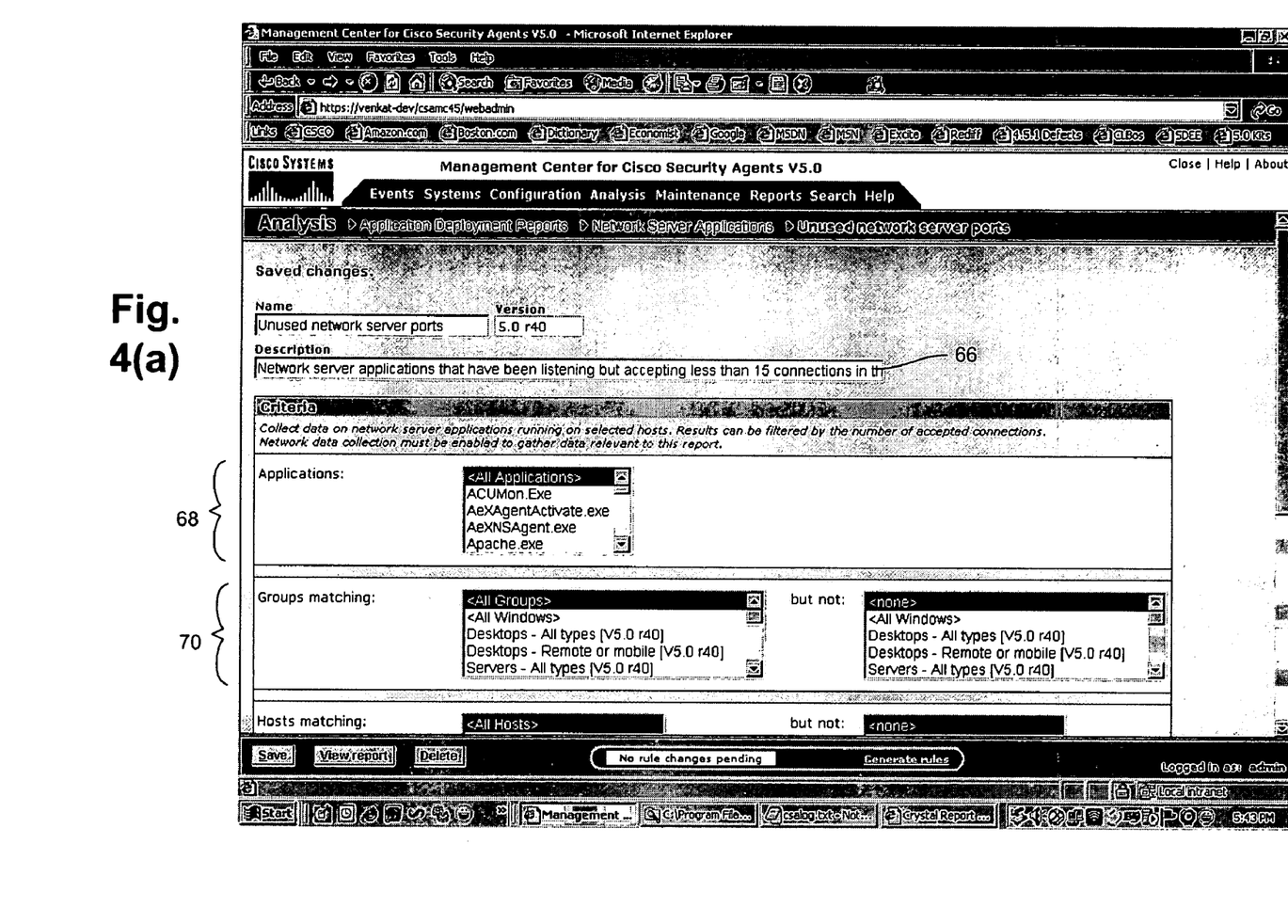
Figure 4B:
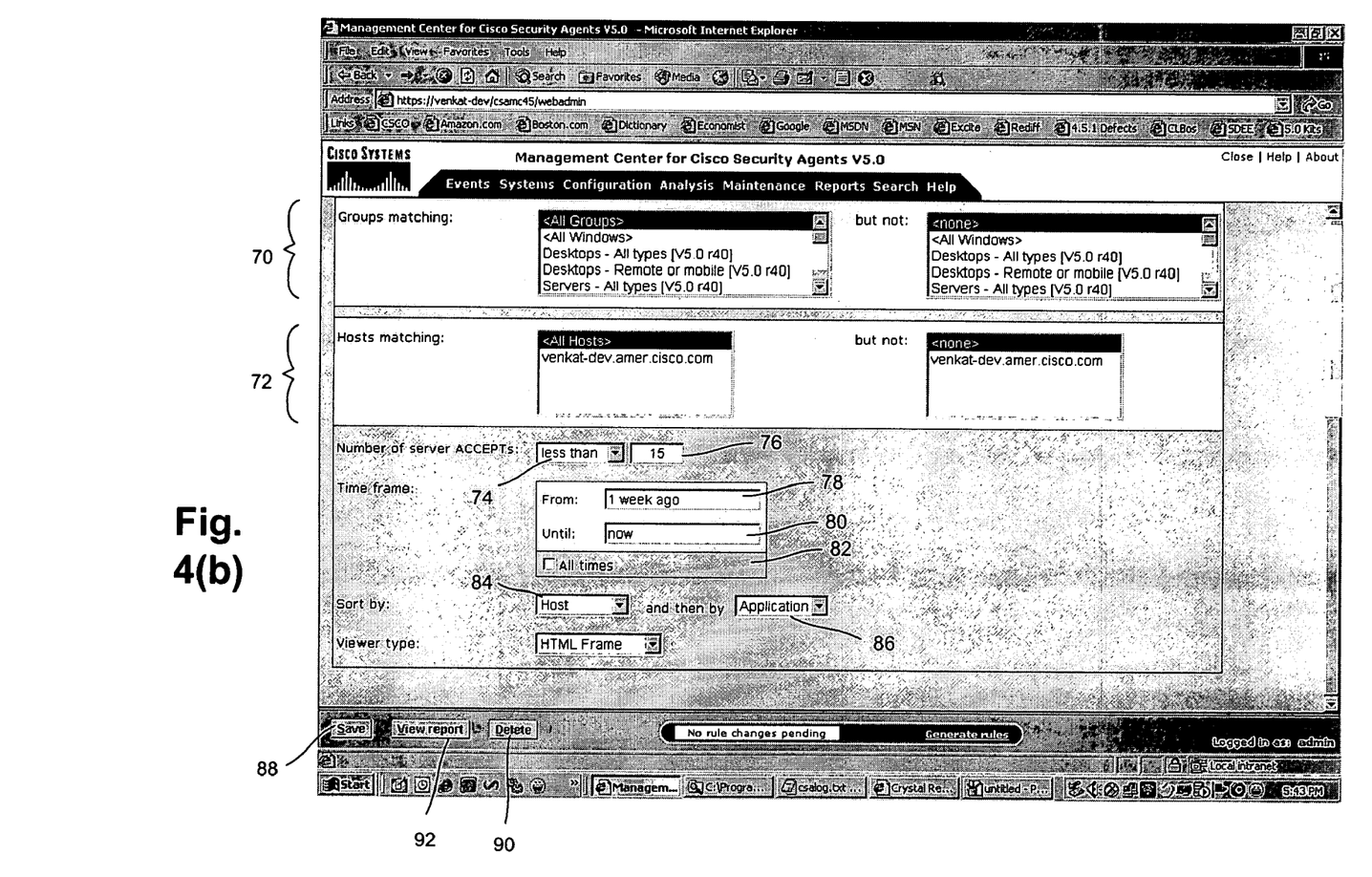

FIG. 4 (which consists of two parts 4(a) and 4(b)) shows a user interface window for a report "template" that a management user can use to define the contents of a report on network activity that the user wishes to see. In particular, the template of FIG. 4 is named "Unused network server ports", and as shown in a description field 66 it identifies network server applications that have been listening for network connections but have accepted fewer than some number of such connections over a recent interval.

The interface window of FIG. 4 includes respective areas 68, 70, 72 for specifying applications, groups, and hosts of interest. Controls 74-82 enable the user to specify a number of server "accept" operations and a time frame as a filter—in the illustrated embodiment, the report will contain entries only for those server applications that have performed less than 15 accepts over the most recent week. The manner of sorting of the report entries can be controlled via user controls 84-86.

Control button 88 can be used to save the template when it is created or modified. Button 90 is used to delete the template, and button 92 is used to generate an actual report based on the template and the current contents of the security management database 28. When button 92 is activated, the management process 24 submits queries to the database server 20 that reflect the selections made in the template. The query results are then utilized to generate a user-readable report.

Figure 5:
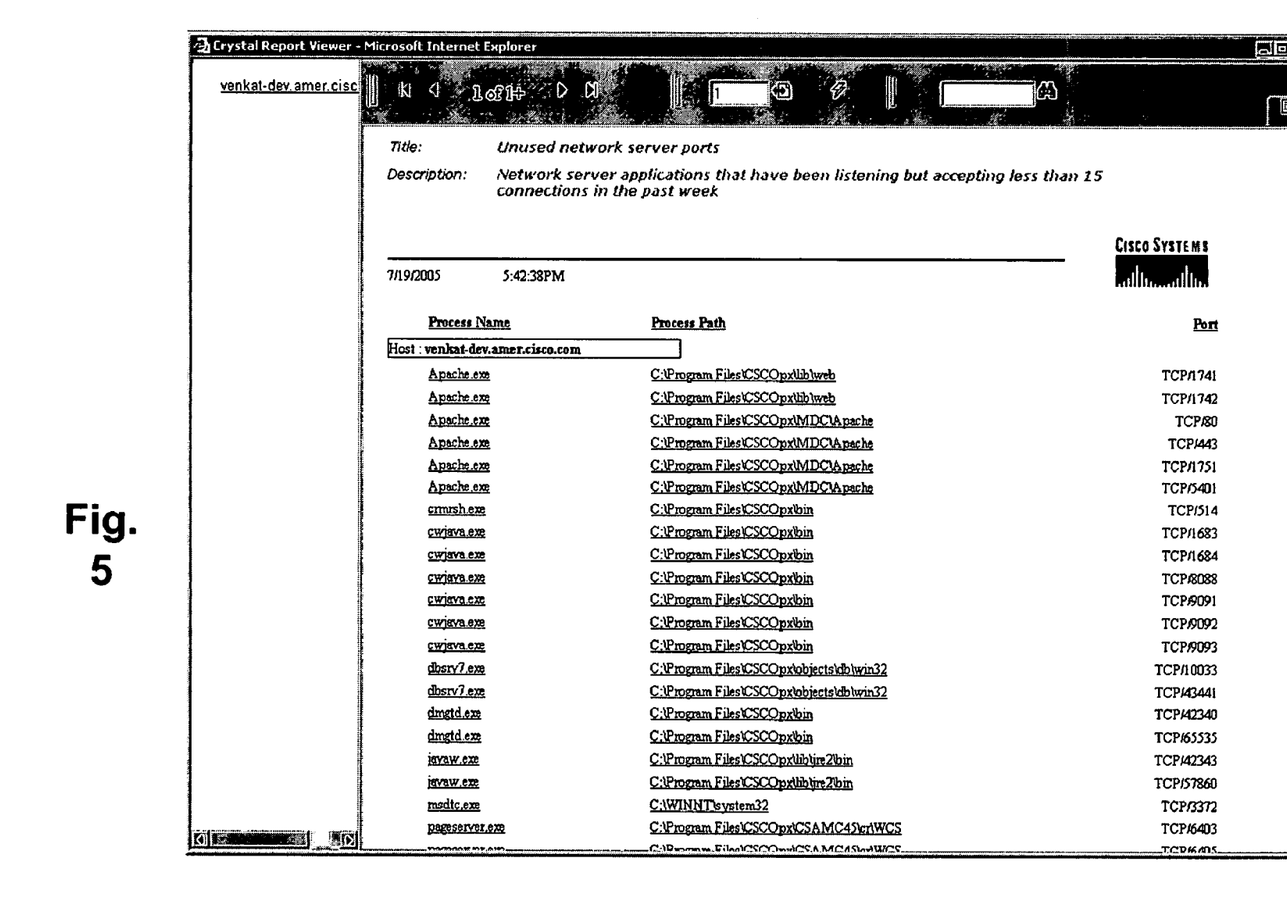
FIG. 5 is a screen shot of a network activity report generated in accordance with the user specification of FIG. 4.

An example of such a report is shown in FIG. 5. As shown, each row identifies an application by process name and process path, and shows the number and type of the listening port. In the illustrated report, all the ports are TCP ports. The entries are grouped by host, as specified in boxes 84 and 86 of the template (FIG. 4).

A report such as that shown in FIG. 5 may be used by a system administrator to take appropriate action to reduce security risks. For example, the administrator may de-activate one or more application processes that have open ports but little or no activity. Alternatively, if a particular application has multiple ports open with only some being underutilized, the administrator may re-configure the application to use fewer ports.

Alternative reports may utilize additional data that is stored in the security management database 28. For example, as shown in Table 1 above, each entry in the network activity data structure may include source and/or destination addresses that identify specific external computer systems that are involved with the activity. This address information may be used to enhance the reporting capability. For example, if it is known that a particular computer system included in the security management system 16 routinely probes certain ports, it may be desirable to omit such probes from the report of network activity. This filtering can be done automatically by including fields in the report template for specifying IP addresses to be ignored, for example. Numerous other filtering techniques may be employed.

While in the TCP context it may be desirable to detect the occurrence of listens as indicating that ports are open, in alternative embodiment it may be necessary or desirable to key off of different network activity. With respect to the connectionless UDP, for example, no listens or accepts are ever performed. One alternative is to detect the occurrence of the bind operations that associate a socket with a port. It may be necessary to employ a different form of network monitoring than that described above with respect to the NW monitor 38.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of monitoring and reporting network activity of applications on a group of host computer systems, comprising:

at a management computer system, providing network activity monitoring rules to the host computer systems, the network activity monitoring rules including rules for monitoring first and second network operations performed by the applications, each first network operation establishing a respective communications mechanism by which an application can engage in network communications with another computer system, each second network operation indicating that a respective communications exchange utilizing the communications mechanism has occurred between the application and the other computer system;

wherein the network activity monitoring rules are used to detect ports that are enabled by the applications but are not in active use during a recent interval;

in response to each host computer system of the group, (i) monitoring network activity of the applications residing on the host computer system in accordance with the network activity monitoring rules provided by the management computer system, (ii) storing local network activity data describing the monitored network activity of the applications in a local network activity data structure, and (iii) periodically uploading the local network activity data to the management computer system the management computer system, (i) receiving the local network activity data uploaded from each of the host computer systems of the group, (ii) utilizing the uploaded data from each of the host computer systems to periodically update a management database including network activity data for all the host computer systems of the group, (iii) in response to user request, generating a user-readable report from the management database showing the network activity of the applications of the host computers of the group, and (iv) in response to detecting the ports that are enabled by the applications but are not in active use during the recent interval, identifying a particular application from the applications to be de-activated;

wherein the management computer system comprises one or more processors.

2. A method according to claim 1, wherein the user-readable report identifies those applications that have performed the first network operation and have performed less than a predetermined number of the second network operations over the recent interval.

3. A method according to claim 1, wherein the first network operation is a listen operation that enables a queue of incoming connection requests within a host computer system.

4. A method according to claim 1, wherein the first network operation is a bind operation that binds a network communications socket with a communications port within a host computer system.

5. A method according to claim 1, wherein the second network operation is an accept operation by which an incoming connection request is accepted by a host computer system.

6. A method according to claim 1, wherein the network activity monitoring rules include an upload interval at which each host computer is to periodically upload its network activity data.

7. A method according to claim 6, wherein the upload interval is user-specified.

8. A method according to claim 1, wherein the management computer system generates the user-readable report according to a user-specified report template.

9. A method according to claim 8, wherein the report template includes an input field in which a user specifies applications to be monitored.

10. A method according to claim 8, wherein the report template includes an input field in which a user specifies a group of hosts to be monitored.

11. A method according to claim 10, wherein the report template further includes an input field in which the user specifies certain hosts within the group of hosts to be monitored.

12. A method according to claim 8, wherein the report template includes input fields for specifying (1) a range of numbers of the second network operations and (2) a time interval as selection criteria for network activity data to be included in the report.

13. A method according to claim 12, wherein the range of numbers of the second network operations is specified as numbers less than a predetermined number.

14. A computer system operative to monitor and report network activity of applications on a group of host computer systems within the computer system, comprising:
   one or more computer processors;
   a management computer system operative to provide network activity monitoring rules to the host computer systems, the network activity monitoring rules including rules for monitoring first and second network operations performed by the applications, each first network operation establishing a respective communications mechanism by which an application can engage in network communications with another computer system, each second network operation indicating that a respective communications exchange utilizing the communications mechanism has occurred between the application and the other computer system;
   wherein the network activity monitoring rules are used to detect ports that are enabled by the applications but are not in active use over a recent interval; and
   in response to each host computer system of the group, an agent operative to (i) monitor network activity of the applications residing on the host computer system in accordance with the network activity monitoring rules provided by the management computer system, (ii) store local network activity data describing the monitored network activity of the applications in a local network activity data structure, and (iii) periodically upload the local network activity data to the management computer system, the management computer system being further operative to (i) receive the local network activity data uploaded from each of the host computer systems of the group, (ii) utilize the uploaded data from each of the host computer systems to periodically update a management database including network activity data for all the host computer systems of the group, (iii) in response to user request, generate a user-readable report from the management database showing the network activity of the applications of the host computers of the group, and (iv) in response to detecting the ports that are enabled by the applications but are not in active use during the recent interval, identify a particular application from the applications to be de-activated.

15. A computer system according to claim 14, wherein the user-readable report identifies those applications that have performed the first network operation and have performed less than a predetermined number of the second network operations over the recent interval.

16. A computer system according to claim 14, wherein the first network operation is a listen operation that enables a queue of incoming connection requests within a host computer system.

17. A computer system according to claim 14, wherein the first network operation is a bind operation that binds a network communications socket with a communications port within a host computer system.

18. A computer system according to claim 14, wherein the second network operation is an accept operation by which an incoming connection request is accepted by a host computer system.

19. A management computer system including a computer processor for use in monitoring and reporting network activity of applications on a group of host computer systems, the management computer system being configured to execute a management process including:
   providing network activity monitoring rules to the host computer systems, the network activity monitoring rules including rules for monitoring first and second network operations performed by the applications, each first network operation establishing a respective communications mechanism by which an application can engage in network communications with another computer system, each second network operation indicating that a respective communications exchange utilizing the communications mechanism has occurred between the application and the other computer system;
   wherein the network activity monitoring rules are used to detect ports that are enabled by the applications but are not in active use during a recent interval;
   receiving local network activity data periodically uploaded from each of the host computer systems of the group, the local network activity data describing network activity of the applications monitored in accordance with the network activity monitoring rules;
   utilizing the uploaded data from each of the host computer systems to periodically update a management database including network activity data for all the host computer systems of the group; and
   in response to user request, generating a user-readable report from the management database showing the network activity of the applications of the host computers of the group;
   in response to detecting the port that are enabled by the applications but are not in active use during the recent interval, identifying a particular application form the applications to be de-activated;
   wherein the management computer system comprises one or more processors.

20. A management computer system according to claim 19, wherein the user-readable report identifies those applications that have performed the first network operation and have performed less than a predetermined number of the second network operations over the recent interval.

21. A management computer system according to claim 19, wherein the first network operation is a listen operation that enables a queue of incoming connection requests within a host computer system.

22. A management computer system according to claim 19, wherein the first network operation is a bind operation that binds a network communications socket with a communications port within a host computer system.

23. A management computer system according to claim 19, wherein the second network operation is an accept operation by which an incoming connection request is accepted by a host computer system.

24. A host computer system including a computer processor forming part of a group of host computer systems having applications whose network activity is to be monitored and reported, the host computer including an agent and a network monitoring component collectively operative to:
   receive network activity monitoring rules from a management computer system, the network activity monitoring rules including rules for monitoring first and second network operations performed by the applications, each first network operation establishing a respective communications mechanism by which an application can engage in network communications with another computer system, each second network operation indicating that a respective communications exchange utilizing the communications mechanism has occurred between the application and the other computer system;
   wherein the network activity monitoring rules are used to detect ports that are enabled by the applications but are not in active use during a recent interval;
   monitor network activity of the applications residing on the host computer system in accordance with the network activity monitoring rules provided by the management computer system;
   store local network activity data describing the monitored network activity of the applications in a local network activity data structure; and
   periodically upload the local network activity data to the management computer system for use in (i) updating a management database including network activity data for all the host computer systems of the group, (iii) generating a user-readable report from the management database showing the network activity of the applications of the host computers of the group, and (iv) in response to detecting the ports that are enabled by the applications but are not in active use during the recent interval, identifying a particular application from the applications to be de-activated;
   wherein the host computer system comprises one or more processors.

25. A host computer system according to claim 24, wherein the user-readable report identifies those applications that have performed the first network operation and have performed less than a predetermined number of the second network operations over the recent interval.

26. A host computer system according to claim 24, wherein the first network operation is a listen operation that enables a queue of incoming connection requests within a host computer system.

27. A host computer system according to claim 24, wherein the first network operation is a bind operation that binds a network communications socket with a communications port within a host computer system.

28. A host computer system according to claim 24, wherein the second network operation is an accept operation by which an incoming connection request is accepted by a host computer system.

29. A non-transitory computer program product comprising a computer-readable medium having a plurality of computer instructions recorded thereon, the computer instructions being operative when executed by a management computer system to cause the management computer system to perform a management process for monitoring and reporting network activity of applications on a group of host computer systems, the management process including:
   providing network activity monitoring rules to the host computer systems, the network activity monitoring rules including rules for monitoring first and second network operations performed by the applications, each first network operation establishing a respective communications mechanism by which an application can engage in network communications with another computer system, each second network operation indicating that a respective communications exchange utilizing the communications mechanism has occurred between the application and the other computer system;
   wherein the network activity monitoring rules are used to detect ports that are enabled by the applications but are not in active use during a recent interval;
   receiving local network activity data periodically uploaded from each of the host computer systems of the group, the local network activity data describing network activity of the applications monitored in accordance with the network activity monitoring rules;
   utilizing the uploaded data from each of the host computer systems to periodically update a management database including network activity data for all the host computer systems of the group; and
   in response to user request, generating a user-readable report from the management database showing the network activity of the applications of the host computers of the group;
   in response to detecting the port that are enabled by the applications but are not in active use during the recent interval, identifying a particular application form the applications to be de-activated.

30. A computer program product according to claim 29, wherein the user-readable report identifies those applications that have performed the first network operation and have performed less than a predetermined number of the second network operations over the recent interval.

31. A computer program product according to claim 29, wherein the first network operation is a listen operation that enables a queue of incoming connection requests within a host computer system.

32. A computer program product according to claim 29, wherein the first network operation is a bind operation that binds a network communications socket with a communications port within a host computer system.

33. A computer program product according to claim 29, wherein the second network operation is an accept operation by which an incoming connection request is accepted by a host computer system.

34. A non-transitory computer program product comprising a computer-readable medium having a plurality of computer instructions recorded thereon, the computer instructions being operative when executed by a host computer system to cause the host computer system to execute a monitoring and reporting process by which the network activity of applications on the host computer system is to be monitored and reported, the monitoring and reporting process including:

receiving network activity monitoring rules from a management computer system, the network activity monitoring rules including rules for monitoring first and second network operations performed by the applications, each first network operation establishing a respective communications mechanism by which an application can engage in network communications with another computer system, each second network operation indicating that a respective communications exchange utilizing the communications mechanism has occurred between the application and the other computer system;

wherein the network activity monitoring rules are used to detect ports that are enabled by the applications but are not in active use during a recent interval;

monitoring network activity of the applications residing on the host computer system in accordance with the network activity monitoring rules provided by the management computer system;

storing local network activity data describing the monitored network activity of the applications in a local network activity data structure; and     periodically uploading the local network activity data to the management computer system for use in (i) updating a management database including network activity data for all the host computer systems of the group, (iii) generating a user-readable report from the management database showing the network activity of the applications of the host computers of the group, and (iv) in response to detecting the ports that are enabled by the applications but are not in active use during the recent interval, identifying a particular application from the applications to be de-activated.

35. A computer program product according to claim 34, wherein the user-readable report identifies those applications that have performed the first network operation and have performed less than a predetermined number of the second network operations over the recent interval.

36. A computer program product according to claim 34, wherein the first network operation is a listen operation that enables a queue of incoming connection requests within a host computer system.

37. A computer program product according to claim 34, wherein the first network operation is a bind operation that binds a network communications socket with a communications port within a host computer system.

38. A computer program product according to claim 34, wherein the second network operation is an accept operation by which an incoming connection request is accepted by a host computer system.

\* \* \* \* \*